W. & T. SCHNEBLY.
Weighing Machine.
No. 20,513.
Patented June 8, 1858.
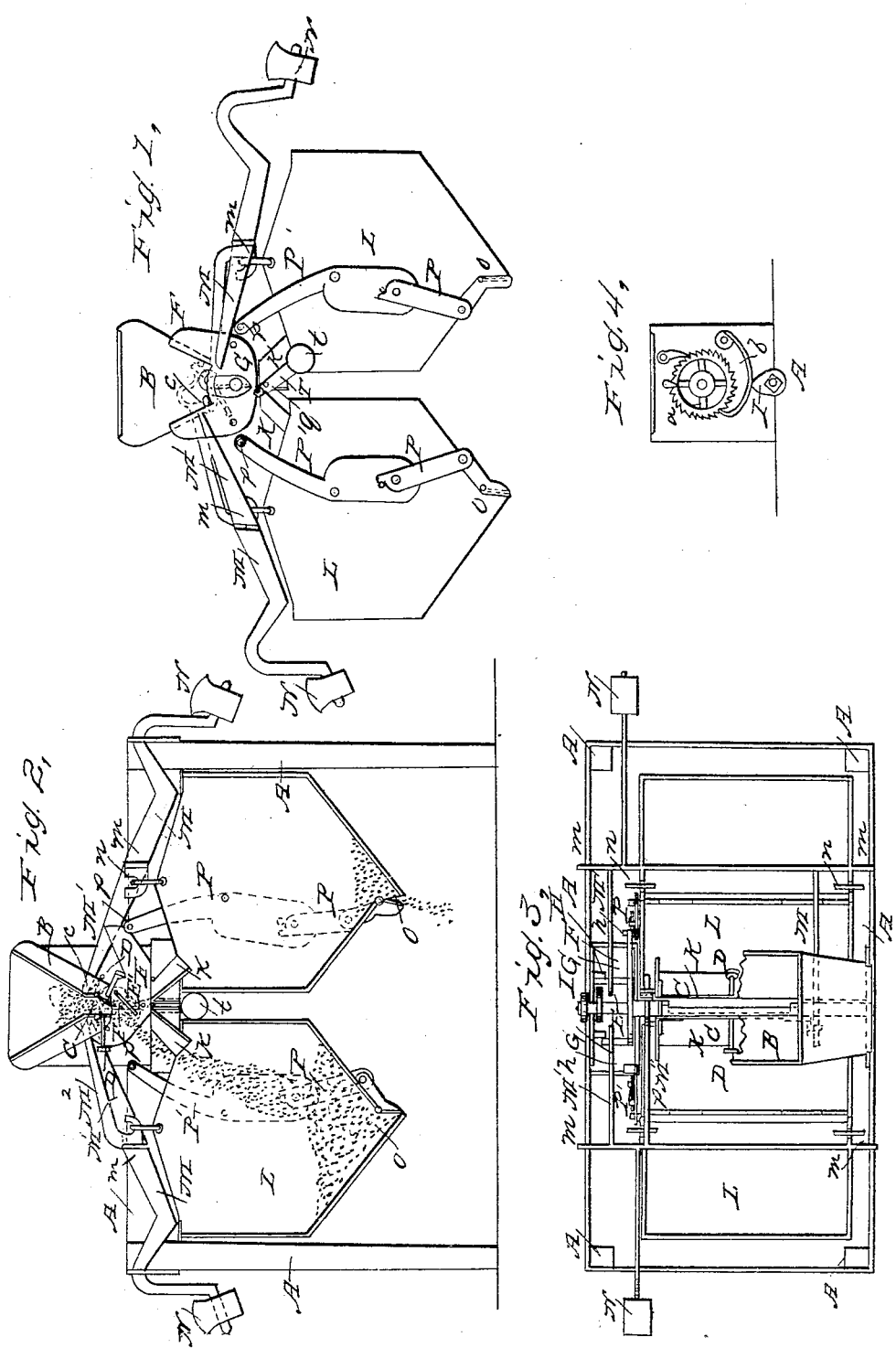

UNITED STATES PATENT OFFICE.

W. SCHNEBLY AND T. SCHNEBLY, OF HACKENSACK, NEW JERSEY.

AUTOMATIC GRAIN-WEIGHING MACHINE.

Specification of Letters Patent No. 20,513, dated June 8, 1858.

*To all whom it may concern:*

Be it known that we, WILLIAM SCHNEBLY and THOMAS SCHNEBLY, both of Hackensack, in the county of Bergen and State of New Jersey, have invented certain new and useful Improvements in Self-Acting Scales or Weighing-Machines for Weighing Grain and other Commodities; and we do hereby declare that the following is a full and complete description or specification thereof, reference being had to the accompanying drawings, which will enable others skilled in the art to make and use the same.

This invention relates to that description of weighing machines, in which the common scale beam and weight are employed, the boxes or receptacles, in which the grain is weighed being hung in the usual manner upon the beam a short distance in advance of the fulcrum, the weights being located upon the rear end of the scale beam, or behind the fulcrum.

Our invention consists in weighing grain, &c., automatically under a continuous flow or otherwise, by the presentation of independent tubs alternately to the flow and by the novel method of arranging the following mechanical devices and by which method the duty of closing the valves which govern the supply of grain or flowing column entering into the receptacle or receptacles to be weighed and also, the duty of opening the valves to permit the quantity of grain, &c., to escape from the receptacles after it has been weighed, is done or performed without employing or using the specific gravity or weight of the grain, &c., for that particular purpose during the period of time or while the quantity is being weighed or determined, which, important point has never before been accomplished, and which in practical operations has been found to obviate those difficulties which have in all attempts heretofore made, given such untruthful results, when the gates are closed and opened by the weight of grain during the process of weighing.

In providing the hopper in which the grain, &c., is to be let, with hinged valves being faced or lined with some kind of flexible material, said valves, each, having weighted levers attached thereto, which are designed to close the port or passage through the hopper and to overbalance the weight of the column of grain, &c., resting on them when closed, leaving, only, so much of the grain to flow into the tubs or receptacles below, in which, it is to be weighed, as may be desired, through openings which may be made in the said valves; in the use of arms projecting from the fulcrum of the beams or levers, and made to reach the weighted levers of the hinged valves and to effect the movement of the same; also, in the use of projecting arms which are made to reach a comb or flanch having pins projecting from the side thereof, said comb or flanch being placed at the end of a balanced valve which is located below the hopper and separate and independent of it, and which in connection with a pendulum having an adjustable weight on it and being located below the balanced valve, are designed to move the said balanced valve, restrain the same for the purpose of passing it gradually through the falling column and to determine the extent of the movement of the same.

The object of making a balanced valve and the location of the same is to equalize the pressure of the falling column on it, whether it be greater or less and to prevent any clogging of the same by dust, or otherwise, which must, necessarily, follow when it is placed within or surrounded by a spout or otherwise; the power therefore, which is required to move the balanced valve being always, the same, no error in the result can be caused thereby; in the employment of toggle-joints being attached to each receptacle used for weighing and which in connection with vertical hinged valves (also faced or lined with some elastic substance) and placed at the bottom of the tube, serve the purpose of holding in or letting out the grain &c., when required.

Referring to the accompanying drawings Figure 1 is a side elevation of our machine with the framing removed, Fig. 2 is a side sectional elevation of the whole machine, Fig. 3, is a plan or top view of the same, Fig. 4, is an enlarged elevation of a portion of the registering device.

Similar letters of reference indicate the same parts.

We use a suitable frame A, A, supported by four legs, a hopper or receiver B, is permanently placed above the frame in the center of the same, said hopper or receiver B, having an outlet or port which is formed by parallel sides protruding downward below the inclined portions or planes of the same, and terminating in hinged valves C, C, which are used to close the outlet or port and stop off the descending flow or column of grain to any desired extent. By means of adjustable weights D, D, which are placed on levers attached to the valves C, C, the pressure of the grain on the said valves when the hopper or receiver B, is full is counterbalanced.

E, is a balanced guide valve having its journals resting on the sides of the frame A A and in a line with the center of the outlet or port of the hopper or receiver B, the said valve E, being made sufficiently wide that, when at rest or inclined, it will overspread the descending flow or column of grain and direct it into one of the tubes only, on the shaft E', of the balanced valve E, is permanently attached a cam F, which has two arms or projections G, G, placed at equal distances from the center of the cam F, which may be placed on either end of the balanced valve E. On the said balanced guide valve shaft E', is attached a second cam H, extending downward a suitable distance and reduced to a point, also, another cam, I, extending upward.

A permanent chute or bridge K, is attached to the frame A, A, in the center of the same, below the balanced guide valve E, said chute or bridge being made sharp in the center and inclined outward and downward. The object and purpose of this stationary bridge or inclined planes is not only to direct the grain into the receptacles below, but to arrest the force of the descending column and prevent the same from producing any undue influence on the process of weighing, the bridge or chute on either side being projected downward to meet the line or surface of the grain when the receptacles have their complement (or nearly so) leaving no space for the grain to fall therefrom.

L, L, are two independent tubs which are suspended on weighted levers or beams M, M, by means of rings ($n, n$). The fulcra or centers ($m\ m$) of the beams rest on the frame A A, the said beams being extended from one side to the other for that purpose; on each lever or beam M M, the adjustable weights N, N, are placed, said weights being in the rear of the fulcra ($m\ m$) that is to say, on the side opposite to the side on which the tubs L, L, are suspended. Each tub, or receptacle L, L, is provided with a port at the bottom, and in the center of the same, which ports are closed or opened, when required, by hinged valves O, O. These valves, it will be seen, are arranged perpendicularly, toggle joints P P', are placed on the side of the tubs L, L, and may be provided with friction rollers ($p, p$,) on their upper arms. Beyond or in advance of the fulcra ($m, m,$) we elongate the beams M M, into arms M' M' M'' M''. The arms M', M', reach the projections G, G, on the cam F; the arms M'', M'', reach the cranks ($c, c,$) of the hinged valves (C, C). A pendulous weighted lever T, with an adjustable weight ($t$) on it, is placed below the balance valve E, on the side of the frame ($q$) being the fulcrum or pivot of said lever. The fulcrum or center ($q$) is in a line with the center of the cam H, the said lever T hanging down in a perpendicular position and being so arranged as to swing to a horizontal position on either side of the perpendicular line. When required, the upper end of the pendulous lever may be provided with a friction roller to relieve the same of friction when it operates.

A register is placed above the frame A, A, on one side, by which the weight or quantity of grain measured is accurately recorded and exhibited to the eye.

($a$) is a cog wheel forming one of a series belonging to any suitable series of registering wheels ($b$) is a latch or moving pawl of ($a$); I, is the cam on the shaft E'. At every movement of E', it will be seen that the cam lifts the latch ($b$) and thus causes the remaining registering wheels to perform their functions.

We are not limited to any special registering arrangement, or mode of giving movement to the register.

Having thus described the formation of the parts used, this arrangement and combination, we will now proceed to give a description of the operation of the same, and although this may be considered like the operation of a man weighing grain in a tub placed on a platform scales, or otherwise, as he lets in the flow, steps it off, gages the exact quantity to balance the weights on the beam, then opens a valve in the bottom of the tub to let the quantity weighed escape, when he records the same. Yet our method is materially different, as no loss of time is occasioned by our machine in doing the duties required, said duties being done mechanically.

The adjustable weights N, N, may be regulated to cause each tub to give the same result, or a dissimilar quantity, at each weighing, as one tub is independent of the other. After adjusting the weights N, N, to give the required quantity at each weighing and also the weight ($t$) on the lever T, and while the whole machine is at rest, the grain may be intrdouced into the hopper or receiver B, and by its own gravity the grain will descend through the port of the hopper B and fall on one side of the balance guide valve E, below, and then to the one side of the chute or bridge K, which, after partially breaking the force or impulse of the same, will then direct the flow into the first tub, which, now, has its hinged valve O, closed below and is ready for the inflowing grain.

Before progressing any further, we will here remark that a hopper or receiver might be used to induct the flow into the tubs, alternately, by making it move on a track from one tub to the other, but the previously described permanent hopper is deemed preferable.

When the grain begins to flow through the port of the hopper or receiver B, the hinged valves C, C, are both open, and permit the whole column of grain to then descend until the adjustable weights N, on the beam or lever M, begin to rise and the tub L, begins to descend by the preponderating quantity of grain taken into the tub, which, in its descent, simultaneously moves the two arms M', M'', which are arranged in advance of the fulcrum ($m$). The arm M'', which has been upholding through the means of a crank ($c$) the weight D, on the hinged valve C, now depresses and deserts the crank, or lever, which causes the weight D, to close the valve, C, and shut the hopper. But, a small thin stream, or driblet, continues to flow for a period of time through the aperture ($i$, $i$,) in the valves C, C, which are, left open for that purpose. The other arm M, presses on the projection A, on the crank F, and the balanced guide valve E, which now begins to change its inclined position of rest and gradually passes through the small continuous flow or stream of grain until the cam H attached to it below presses the apex of the friction roller on the upper end of the pendulous lever T, with its weight ($t$) which it had encountered when it first began to move from its place of rest. As the balance valve E passes through the small continuous flow or driblet column of grain it divides the flow equally which is now for a period directed by the chute or bridge, K, by its inclination into both tubs simultaneously one half of the grain passing into each tub until the cam H lets the pendulous lever drop. As the balanced guide valve E approaches its opposite place of rest, it diminishes the quantity of grain flowing into the first tub in proportion to the increase of the quantity flowing into the other tub, and just when the edge of the balanced guide valve E, reaches the line which marks the extent of the continued flow or driblet column of grain, it then isolates the quantity contained in the first tub by taking its other inclined position of rest, when the pendulous lever T falls into a perpendicular position again after maintaining a balance or equilibrium during the flow of the small continued stream. The release of the pendulous lever T, gives the descending tub increased force which causes the cam F, to strike the roller which may be provided on the upper arm of the toggle-joint P', and break the joint and cause the valve, O, to open the port of the tub, and let out the quantity of grain just weighed, the port remaining open until the next tub L, begins to descend when the cam F, changes its position and releases the lever P'. The weight of levers P, P', causes the valve, O, to close and so on, alternately. The register records the number of bushels and pounds weighed in each tub and gives the aggregate of the same. When the first tub lets out a portion of the grain the weight N, will then descend carrying up the tub again and arms M', M'', while the grain still continues to escape from the first tub until empty. The ascent of the arm M'' now strikes the crank or lever ($c$) of the hinged valve C, C, and again lets in the full flow or column of grain by opening the port of the hopper or receiver B, which now flows into the second or next tub, and so on alternately. Thus, we have grain flowing first into one tub, then into both for a period then into one again and out of the other at the same time, that it is weighing and discharging. But, in other machines much time is lost because the flow is entirely cut off, and time is required to receive and discharge the quantity desired to be weighed.

In our experiments in grain weighing, we have found much difficulty in getting a true result as the force and momentum which the tubs would receive after taking in the quantity necessary to overcome positive weight or weights acting with their maximum power as, for example, one, two, or three weights being so arranged as to cause their full or maximum power to resist the influx of grain into a tub will have this effect. After the first weight is overcome by the flow, the tub will suddenly start off downward, and if checked by a second similar weight it will, also, start off more suddenly, and so on in proportion to the number of weights and starts which it makes under the increased load which the tub receives. But in the present plan of weighing, we avoid all these difficulties; as we have the means employed to break and check the momentum of the tubs entirely, viz., First in displacing or taking off the weights D, D, which rest on the arms of valves C, C, and may be considered equal to so much of a supposed quantity of grain contained in the descending tub, which gives additional resisting force to the weights N, N; 2d, by diminishing the flow or column to a small continuous stream only, which then gently or lightly falls into the tub; and 3d by a contact of the cam H, on the balanced valve E, with the pendulous lever T, which keeps up a perfect equilibrium, or balance, as it ascends from a perpendicular toward a horizontal line, during the flow of the small stream or column until the required quantity is received in the gradually descending tub, and it is then suddenly isolated by the dropping of the pendulous lever T, and weight (t); giving a truthful result at each weighing and removing all liability to derange the machine, as the movements are all harmonious and gentle.

By arranging the valve O, O, in a perpendicular or nearly a perpendicular position, as shown, the direct vertical pressure of the column of grain contained in the tubs L, L, upon said valves is avoided. The vertical pressure of a column of grain is far greater than its lateral pressure; consequently when the valves O, O, are placed perpendicularly, as shown, or in line with the vertical pressure of the grain which falls into the tubs L L, the said valves have only to resist the lateral or angular pressure of the grain. This pressure is so comparatively slight that the mere weight of the toggle levers P, P', suffices to keep the valves O, closed against the pressure of the grain within. The use of the toggle levers P, P' for opening and closing the valves O, is an important feature in our machine, since they present a special virtue when thus employed. They close the valves O, O, by self action, and lock them firmly; yet the slightest touch upon the upper end of the lever P, throws the valves O, O, instantly open.

The valves O, O, may be faced with india rubber or other elastic material. This will prevent all liability of leakage by the interposition of kernels of grain between the edges of the ports and the valves. The elastic lining may also be extended up so as to cover the hinges of the valves O, O; all dust will be thus excluded from said hinges. The valves C, C, may also be lined or composed wholly of rubber if desirable, for analogous purposes.

We do not claim to be the first inventors of weighing machines in which the weight of the grain was made to open and close valves for regulating the supply and discharge of the same; for many such machines have been made. Neither do we claim, broadly in weighing machines, the operating of the parts which control the supply and discharge of the grain by means of the scale beam or by means of parts connected with the scale beam, many other machines have been made in which this feature is seen. The patent of W. H. Bramble, April 8th, 1856 is an example in point. In this device a connection is made, for one of the purposes just mentioned, with the scale beam; our connection is behind or in the rear of the fulcrum. It is a great and important point to have the scale beam elongated in front or in advance of the fulcrum, and to operate the parts which control the supply of and discharge of the grain by arms M. M'', in front of the fulcrum. This arrangement permits the discharge valves O, O, to be kept open for the full exit of the grain until the opposite tub L, has been filled. The valves could not thus be kept open, if they were operated by means of the rear end of the scale beam. The use of the elongated arms in front of the fulcrum also permits a great simplification of the machine, and dispenses with the necessity of connecting rods and levers, lessens the number of points of friction, and promotes the probabilities of accuracy.

We therefore claim and desire to secure by Letters Patent;

1. The weighing of grain, &c., automatically under a continuous flow, or otherwise, without employing the gravity or weight of grain, being weighed, for the purpose of checking or cutting off the supply of grain entering into the receptacles to be weighed, or for the purpose of discharging the grain from the receptacles in which it has been weighed, during the period of the process of weighing, or when the quantity of grain is being determined or weighed, substantially and in the manner as above set forth.

2. We claim providing the hopper with hinged valves, each having a lever with a weight on it and attached thereto, when used in combination with projecting arms, which are made to operate the same, in the manner and for the purpose as above set forth.

3. We claim the balanced valve in its location below the hopper and above the stationary bridge or chute, when used in combination with projecting arms, combs, etc., and a pendulum with an adjustable weight in the manner and for the purpose, substantially as set forth.

4. We claim the toggle joints in combination with vertical hinged valves when operated on and for the purpose as herein substantially set forth.

WM. SCHNEBLY.
THOS. SCHNEBLY.

Witnesses:
WM. S. BANTA,
JACOB H. ZABUSKIE.